(12) United States Patent
Bolze et al.

(10) Patent No.: US 7,798,212 B2
(45) Date of Patent: Sep. 21, 2010

(54) SYSTEM AND METHOD FOR FORMING DOWNHOLE CONNECTIONS

(75) Inventors: Victor M. Bolze, Houston, TX (US); David Wei Wang, Manvel, TX (US); Rex C. Mennem, Stafford, TX (US); David L. Verzwyvelt, West Columbia, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 648 days.

(21) Appl. No.: 11/380,303

(22) Filed: Apr. 26, 2006

(65) Prior Publication Data

US 2006/0243454 A1 Nov. 2, 2006

Related U.S. Application Data

(60) Provisional application No. 60/594,688, filed on Apr. 28, 2005.

(51) Int. Cl.
*E21B 17/02* (2006.01)

(52) U.S. Cl. .................. 166/242.6; 166/242.1

(58) Field of Classification Search ............ 166/242.1, 166/242.6; 439/135, 136, 137; 138/104, 138/115, 116, 155
See application file for complete search history.

(56) References Cited

U.S. PATENT DOCUMENTS

| | | | | |
|---|---|---|---|---|
| 3,315,741 A | * | 4/1967 | Triplett ....................... 166/352 |
| 3,452,815 A | * | 7/1969 | Watkins ....................... 166/344 |
| 4,494,602 A | * | 1/1985 | Capdeboscq et al. ....... 166/66.4 |
| 4,585,287 A | * | 4/1986 | Ramsey et al. .............. 439/588 |
| 4,756,595 A | * | 7/1988 | Braun et al. .................. 385/75 |
| 4,815,989 A | * | 3/1989 | Kataoka et al. ............. 439/426 |
| 5,954,135 A | * | 9/1999 | Williamson et al. ......... 166/382 |
| 6,050,544 A | | 4/2000 | Meronek ................. 251/149.6 |
| 6,186,229 B1 | * | 2/2001 | Martin et al. ........... 166/250.08 |
| 6,302,203 B1 | * | 10/2001 | Rayssiguier et al. ... 166/250.01 |
| 6,302,216 B1 | * | 10/2001 | Patel ........................... 166/375 |
| 6,349,770 B1 | * | 2/2002 | Brooks et al. ............... 166/383 |
| 6,378,610 B2 | * | 4/2002 | Rayssiguier et al. ........ 166/281 |

(Continued)

FOREIGN PATENT DOCUMENTS

DE 2453237 * 5/1976

(Continued)

OTHER PUBLICATIONS

Bybee, Karen, 2003, "Development of HP/HT Fiber-Optic Connectors for Subsea Intelligent Wells," of paper OTC 15323, pp. 48-49 (see http://www.odi.com/ODI_Documents/Articles_and_Papers/pdf/JPT-August2003-Article.pdf).*

*Primary Examiner*—Kenneth Thompson
*Assistant Examiner*—Sean D Andrish
(74) *Attorney, Agent, or Firm*—Rodney Warfford; Van Someren, PC

(57) ABSTRACT

A technique is provided to facilitate connection of completion assemblies at a downhole location. A completion assembly comprises a control line conduit having a connector designed for coupling with a corresponding connector of a next adjacent completion assembly. A cover is selectively used to block entry of debris and other contaminants into the connector during deployment of the completion assembly downhole prior to engagement with the next adjacent completion of assembly.

21 Claims, 5 Drawing Sheets

U.S. PATENT DOCUMENTS

| | | | |
|---|---|---|---|
| 6,390,193 B1 * | 5/2002 | Martin et al. | 166/250.08 |
| 6,571,046 B1 * | 5/2003 | Hickey et al. | 385/134 |
| 6,684,950 B2 * | 2/2004 | Patel | 166/250.01 |
| 6,966,384 B2 * | 11/2005 | Griffiths | 166/380 |
| 6,983,796 B2 | 1/2006 | Bayne et al. | 166/278 |
| 2002/0000317 A1 | 1/2002 | Rayssiguier et al. | 166/285 |
| 2003/0085815 A1 | 5/2003 | Tilton et al. | 340/854.4 |
| 2003/0211768 A1 * | 11/2003 | Cameron et al. | 439/191 |
| 2005/0021141 A1 | 1/2005 | Bleyer et al. | 623/15.12 |
| 2005/0045329 A1 | 3/2005 | Wetzel et al. | 166/278 |
| 2005/0072564 A1 | 4/2005 | Grigsby et al. | 166/65.1 |

FOREIGN PATENT DOCUMENTS

| | | | |
|---|---|---|---|
| GB | 2.333.786 A | * | 8/1999 |
| GB | 2333786 A | | 8/1999 |
| GB | 2.399.582 A | * | 9/2004 |
| GB | 2399582 A | | 9/2004 |
| GB | 2407649 A | | 5/2005 |
| WO | WO0206625 A1 | | 1/2002 |
| WO | WO2005045175 A2 | | 5/2005 |
| WO | WO2005045185 A1 | | 5/2005 |

* cited by examiner

SYSTEM AND METHOD FOR FORMING DOWNHOLE CONNECTIONS

CROSS-REFERENCE TO RELATED APPLICATION

The present document is based on and claims priority to U.S. provisional application Ser. No. 60/594,688, filed Apr. 28, 2005.

BACKGROUND

Many types of wells, e.g. oil and gas wells, are completed with two or more completion assemblies. For example, a lower completion assembly may be moved downhole initially on a running string. After deployment of the lower completion assembly at a desired location in the wellbore, an upper completion assembly is deployed downhole and engaged with the lower completion assembly.

In many applications, a variety of control lines extend through each completion assembly and are coupled at the downhole location when the completion assemblies are engaged. Sometimes the connection formed between completion assemblies at the downhole location is referred to as a wet-mate connection.

The control lines may comprise conduits extending along each completion assembly. The conduits can be used to convey hydraulic signals or to receive fiber optic or electrical lines therein. However, such conduits are susceptible to incursion of debris and other contaminants while the lower completion assembly remains downhole prior to engagement with the upper completion assembly. The conduits also are susceptible to incursion of debris and contaminants during movement of the completion assembly downhole.

SUMMARY

In general, the present invention provides a system and method for connecting a control line conduit downhole without exposing the control line conduit to debris or other contaminants. A completion assembly is prepared with a control line conduit having a connector designed for coupling to a corresponding connector of an adjacent completion assembly. A cover is used to block entry of debris or other contamination into the connector. The cover is removed when the completion assembly is engaged with the adjacent completion assembly.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention relates to a system and methodology that uses a cover for covering a conduit in a completion assembly to prevent debris and other wellbore contaminants from entering the conduit. In one embodiment, the present invention includes a cover for a conduit formed in a lower completion assembly installed in a wellbore. The cover protects the lower completion assembly conduit from contamination until an upper completion assembly and its corresponding conduit are deployed in the wellbore and mated with the lower completion assembly thereby rupturing, shearing, removing, or otherwise displacing the cover to complete the conduit.

Figure 1:
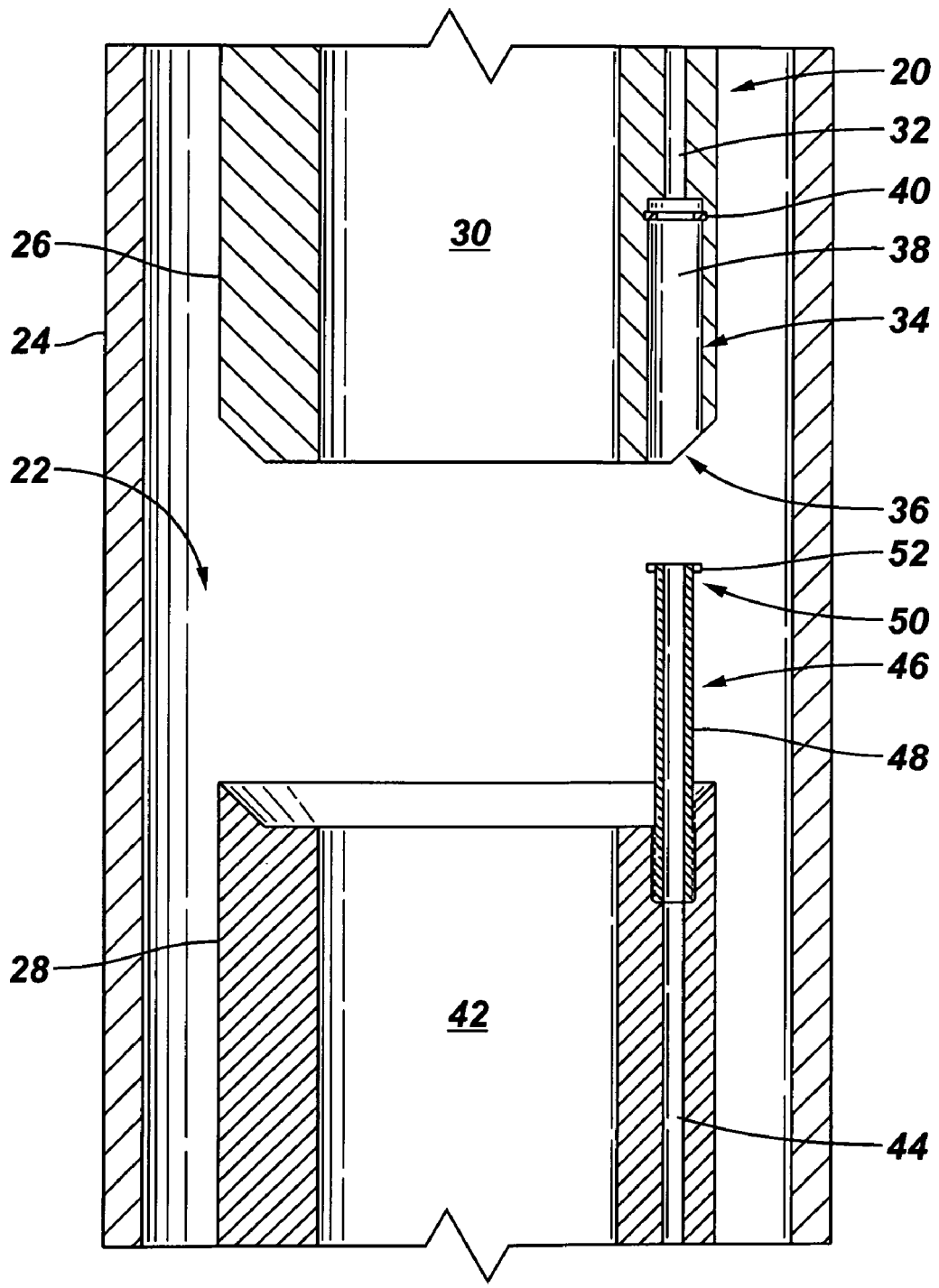
FIG. 1 is a schematic view of a wellbore with a completion having completion assemblies being moved into engagement, according to an embodiment of the present invention.

Referring generally to FIG. 1, a tool string 20 is deployed in a wellbore 22 that may be lined with a casing 24. The tool string 20 generally comprises a plurality of completion assemblies, such as an upper completion assembly 26 and a lower completion assembly 28. In many applications, lower completion assembly 28 is initially deployed and moved to a desired location within wellbore 22. Subsequently, upper completion assembly 26 is deployed and moved downhole for engagement with the lower completion assembly 28. In one embodiment, the upper completion assembly 26 may be in the form of a stinger stabbed into a receptacle area of the lower completion assembly 28.

In the embodiment illustrated, upper completion assembly 26 comprises a primary conduit 30 for conducting fluid flow and a control line conduit 32 extending to a control line conduit connector 34 having a connector end 36 for receiving a corresponding connector from the next adjacent completion assembly. Although connector 34 may be constructed in a variety of forms, the illustrated embodiment shows connector 34 as a receptacle 38, such as an axial bore. The control line conduit connector 34 further comprises a shoulder 40, such as a snap ring, positioned in receptacle 38 and extending radially inward from the outer wall of the receptacle.

The lower completion assembly 28 comprises a primary conduit 42 for conducting fluid flow and a control line conduit 44 extending to a control line conduit connector 46. In this embodiment, control line conduit connector 46 comprises a stem 48 having a connector end 50 designed for receipt in receptacle 38. The lower completion assembly 28 also comprises a cover 52 that seals or otherwise protects control line conduit 44 from debris and/or other contaminants in the wellbore until the lower control line conduit connector 46 is engaged with the upper control line conduit connector 34. As will be discussed in greater detail below, a cover also can be used to seal or otherwise protect control line conduit 32 as an alternative to or in addition to the cover located on connector 46.

In many wellbore operations, it is desirable to install the lower completion assembly 28 at a desired location within wellbore 22 until a later time period when the upper completion assembly 26 is moved into the wellbore and into engagement with the lower completion assembly. During the time between initiating installation of the lower completion assembly 28 and the mating of the upper completion assembly 26, the cover 52 protects connector 46 and control line conduit 44 from getting plugged by debris and/or from being contaminated with undesirable constituents in the wellbore fluid.

Figure 2:
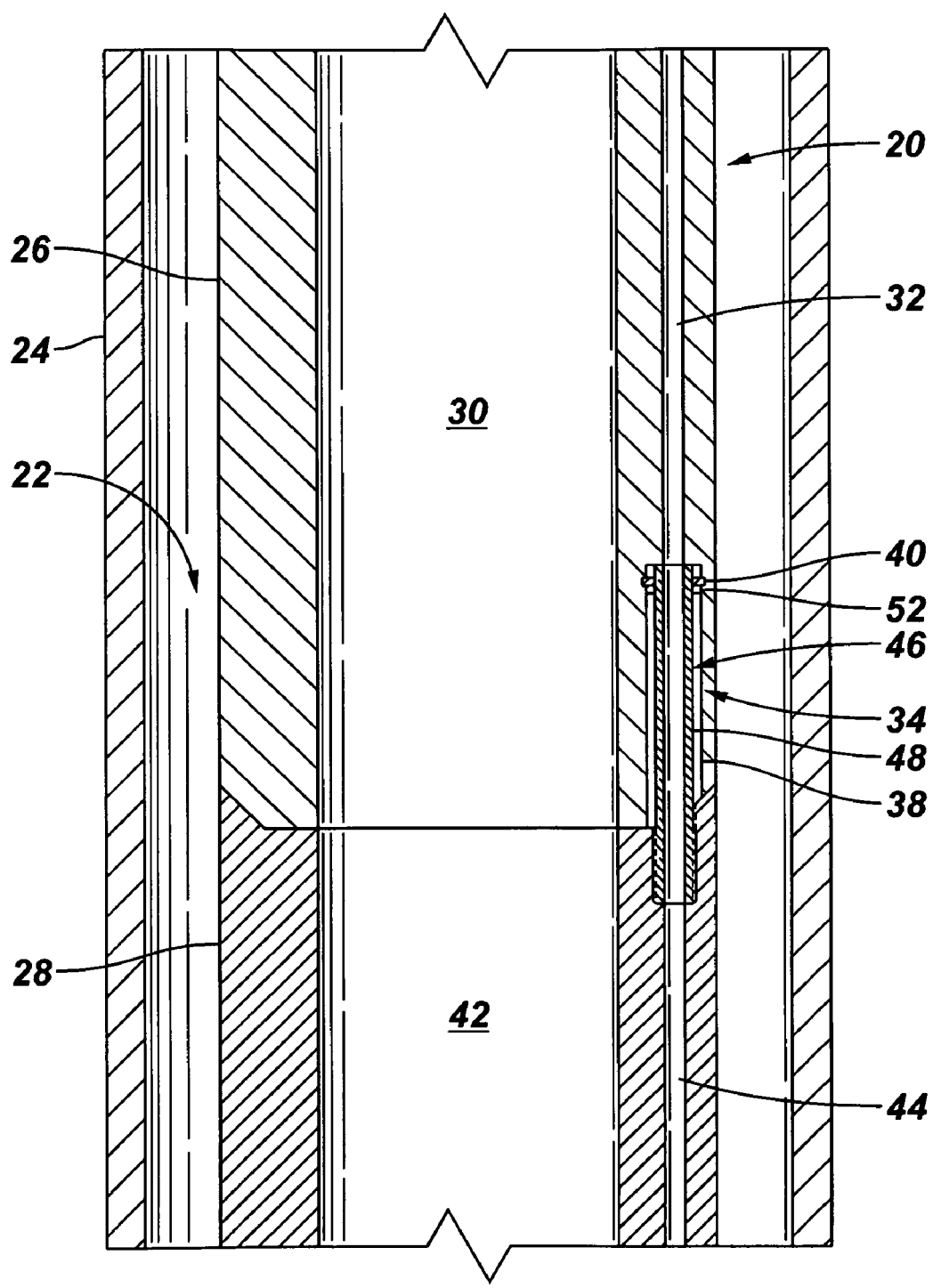
FIG. 2 is a schematic view similar to that of FIG. 1 but showing the completion assemblies fully engaged, according to an embodiment of the present invention.

To engage or mate the upper completion assembly 26 with the lower completion assembly 28, the upper completion assembly 26 is lower through the cased or open wellbore until it reaches the lower completion assembly 28, as illustrated in FIG. 1. When upper completion assembly 26 is moved further downhole into engagement with lower completion assembly 28, connectors 34 and 46 also become engaged or coupled, as illustrated best in FIG. 2. The stem 48 of lower completion assembly 28 engages receptacle 38 of the upper completion assembly 26 and cover 52 moves against shoulder 40. As the movement of upper completion assembly 26 continues, stem 48 displaces, e.g. ruptures, cover 52 to complete a continuous conduit between control line conduit 32 and control line conduit 44 (see FIG. 2). The completed conduit may be used in a variety of wellbore operations as a hydraulic conduit for hydraulic communication, for example, or as an open conduit for receiving an electrical or fiber optic communication line. In the latter case, communication lines can be inserted or pumped through the completed conduit.

Figure 3:
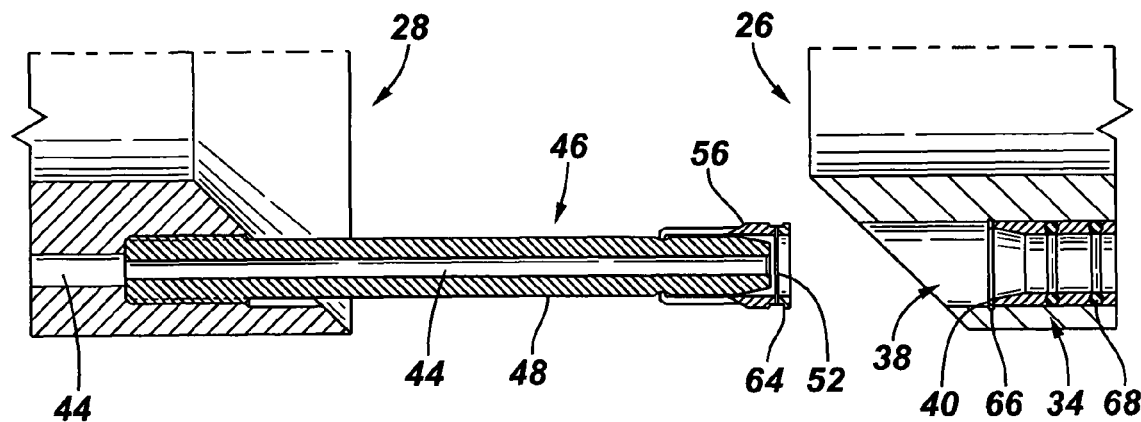
FIG. 3 is a partial cross-sectional view of a pair of connectors used to couple conduits between adjacent completion assemblies, according to an embodiment of the present invention.
Figure 4:
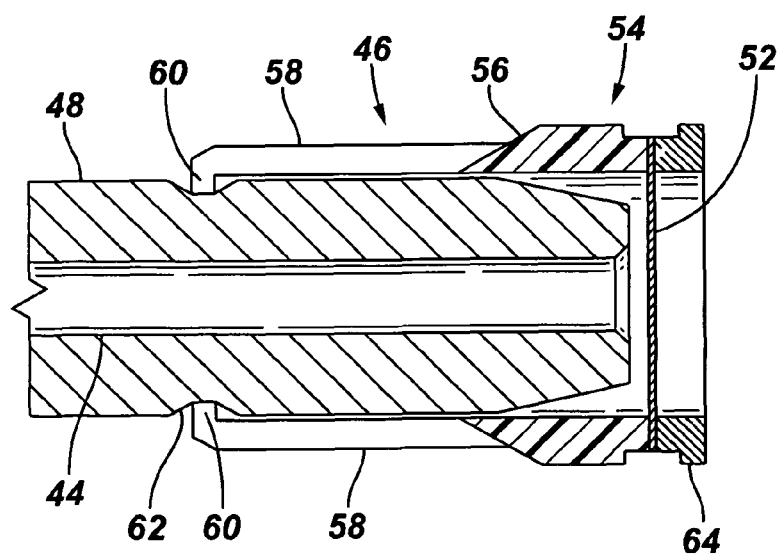
FIG. 4 is a partial cross-sectional view of an embodiment of a connector having a cover protecting the connector from debris and other contaminants, according to an embodiment of the present invention.

Referring generally to FIGS. 3 and 4, another embodiment of the connector assembly and the debris excluding cover is illustrated. In this embodiment, connectors 46 and 34 are again provided in the form of stem 48 and receptacle 38, respectively. Cover 52 is connected to control line conduit connector 46 to block incursion of debris or other contaminants into control line conduit 44. Cover 52 is connected via a cover assembly 54 having a sleeve member 56 with a plurality of collet fingers 58 that engage connector 46. For example, each collet finger 58 has a collet 60 that engages a groove 62 formed in stem 48. Cover assembly 54 also may comprise a ring 64 positioned on an opposite side of cover 52 from sleeve 56 to engage shoulder 40. In this embodiment, cover 52 may be formed as a rupture disk positioned to seal or otherwise cover conduit 44. However, cover 52 also can be constructed in a variety of shapes and forms including a generally flat cover, a conical cover, a hemispherical cover or a cover of an additional alternate shape. The cover 52 also can be formed from overlapping members, e.g. overlapping paddles, or other structures that enable selective displacement of the cover.

Figure 5:
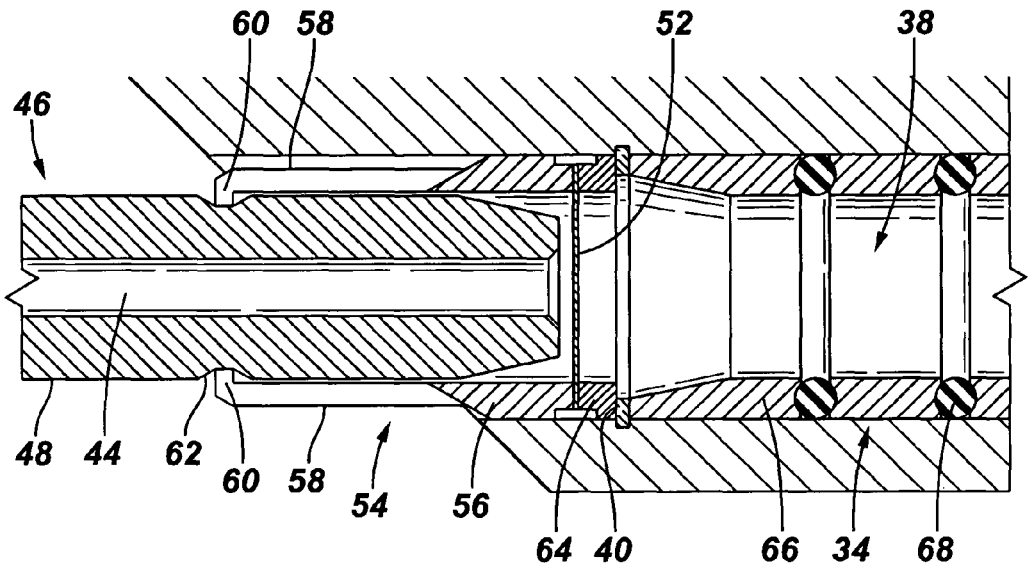
FIG. 5 is a partial cross-sectional view of an embodiment of a first connector being engaged with a second connector just prior to removal of a cover, according to an embodiment of the present invention.

Control line conduit connector 34 is formed in upper completion assembly 26 and comprises receptacle 38 which may be in the form of an axial bore for receiving stem 48, as illustrated FIG. 3. A snap ring 66 is installed in receptacle 38 to provide the shoulder 40 or to support the shoulder 40 against which ring 64 is pressed as stem 48 is inserted into receptacle 38, as illustrated in FIG. 5.

Figure 6:
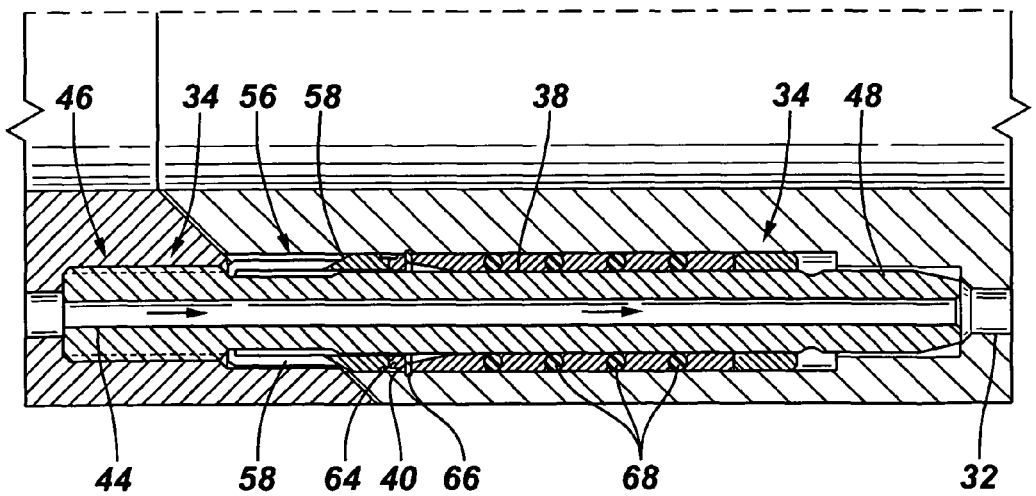
FIG. 6 is a partial cross-sectional view of a pair of connectors fully engaged, according to an embodiment of the present invention.
Figure 7:
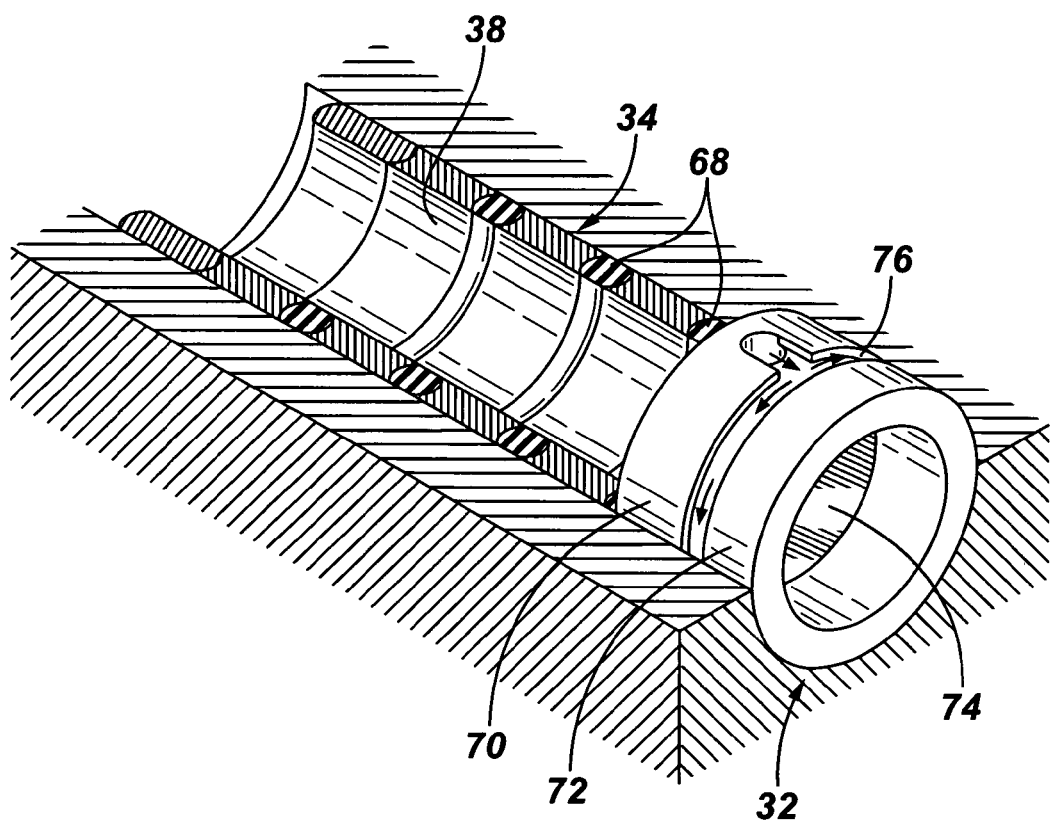
FIG. 7 is a partial cross-sectional view of a second cover employed in a second completion assembly, according to an embodiment of the present invention.

As connector 46 is further engaged with connector 34, collets 60 are forced out of groove 62 and stem 48 is pressed through cover 52 and further into receptacle 38. In this embodiment, one or more seals 68 are positioned along receptacle 38 to form a seal between stem 48 and receptacle 38 when the connectors are coupled, as illustrated in FIG. 6.

Seals 68 may comprise, for example, O-ring seals or seal stacks. In this particular example, cover 52 comprises a rupture disk that is ruptured as stem 48 is forced therethrough. However, cover 52 also can be designed to be displaced according to other methods, including methods that involve sliding or pivoting the cover out of the path of stem 48 as it moves into receptacle 38. In other embodiments, cover 52 can be attached to stem 48 sufficiently tight to block the intrusion of debris while providing space to enable the flow of well fluid into the conduit around the sleeve.

In operation, stem 48 is inserted into receptacle 38 such that ring 64 engages shoulder 40. The engagement of ring 64 with shoulder 40 prevents cover assembly 54, and specifically sleeve 56, from moving through receptacle 38. Upon application of sufficient force due to movement of completion assembly 26 into engagement with completion assembly 28, the collet fingers 58 of sleeve 56 disengage from stem 48, thus enabling the stem to proceed through cover 52 into receptacle 38. When the stem 48 is fully inserted into receptacle 38, seals 68 provide a seal between the stem the surrounding receptacle to complete the control line conduit between completion assemblies.

The debris exclusion cover 52 used with control line conduit connector 46 provides one example of cover placement. However, additional or alternate covers can be used to further block the potential influx of debris and other contaminants. For example, a cover assembly 70 can be deployed within receptacle 38 to block debris and other contaminants from entering connector 34 and control line conduit 32. Although cover assembly 70 can be constructed according to a variety of designs, the illustrated design utilizes an outer housing 72 sized for cooperation with receptacle 38. The outer housing 72 supports a cover 74 and may be positioned on either side of seals 68 or between seals 68, depending on the specific application. In the embodiment illustrated, cover 74 comprises a rupture disk. Housing 72 also may comprise flow ports or channels 76 that enable the flow of some well fluid while limiting movement of debris. According to an embodiment, the flow ports 76 serve to clean the front of the cover 74 prior to stabbing. The fluid is pumped from surface down the control line conduit 32. The fluid exits the inner diameter of the housing 72 behind the cover 74 through flow ports 76 and then travels through milled passages on the outside of the housing 72 and then back inside the front ring through the flow ports 76.

In operation, stem 48 is inserted into receptacle 38 and through outer housing 72 during engagement of completion assembly 26 with completion assembly 28. As stem 48 moves through outer housing 72, cover 74 is displaced and the control line conduit is completed, as described above. Cover 74 can be used in addition to cover 52 or as an alternative to cover 52.

It should be noted the upper and lower completion assemblies are provided as examples, and the completion assemblies can have a variety of assemblies or components that are coupled together at a downhole location. The completion assemblies may be conventional completion assemblies, such as perforating gun assemblies, hydraulic control valve assemblies, other downhole valve assemblies, sand screen assemblies or other completion assemblies or tools in a variety of combinations. Additionally, the conduit completed by the downhole coupling of connectors can be used as a hydraulic conduit, other fluid conduit, or conduit for receiving other communication lines, such as electrical or fiber optic lines. The specific configuration of the connectors also can be adjusted for a variety of downhole applications.

Accordingly, although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A system for use in a wellbore, comprising:
   a lower well completion assembly deployed downhole in a wellbore, the lower well completion assembly having a control line conduit with a connector for connection to a corresponding connector of an upper well completion assembly, the control line conduit being external to a primary conduit for conducting fluid flow; and
   a cover deployed over the connector until engagement of the upper well completion assembly with the lower well completion assembly, wherein the engagement causes the cover to rupture and creates a continuous control line conduit through the connector and the corresponding connector.

2. The system as recited in claim 1, wherein the connector comprises a stem along which extends the control line conduit, the cover engaging the stem.

3. The system as recited in claim 1, wherein the cover comprises a rupture disk.

4. The system as recited in claim 3, further comprising the upper completion assembly and the corresponding connector, wherein the corresponding connector comprises a bore positioned to receive the connector.

5. The system as recited in claim 4, wherein the connector comprises a stem and a sleeve to couple the cover to the connector.

6. The system as recited in claim 5, wherein during engagement of the upper well completion assembly with the lower well completion assembly the stem is forced through the sleeve to rupture the cover.

7. The system as recited in claim 4, wherein the corresponding connector further comprises a temporary cover.

8. A method, comprising:
   preparing a completion assembly for connection with a corresponding completion assembly at a downhole location;
   providing the completion assembly with a control line conduit having a connector;
   covering the connector with a cover to protect the control line conduit from debris until engaged with the corresponding completion assembly in a manner that causes rupture of the cover;
   pumping a fluid across the connector to remove debris; and
   forming a continuous control line conduit through the connector and along the completion assembly and the corresponding completion assembly upon engagement of the completion assembly and the corresponding completion assembly.

9. The method as recited in claim 8, wherein preparing comprises preparing the completion assembly as a lower completion assembly.

10. The method as recited in claim 8, wherein preparing comprises preparing the completion assembly as an upper completion assembly.

11. The method as recited in claim 8, wherein providing comprises forming the connector as a stem, and covering comprises attaching a cover to the stem.

12. The method as recited in claim 8, wherein providing comprises forming the connector as a receptacle, and covering comprises deploying a temporary cover across the receptacle.

13. A method, comprising:
    deploying a lower completion assembly downhole into a wellbore;
    preventing debris from entering a lower control line conduit of the lower completion assembly with a cover;
    moving an upper completion assembly, having an upper control line conduit, downhole into engagement with the lower completion assembly;
    displacing the cover when the lower control line conduit is coupled with the upper control line conduit;
    forming a continuous conduit from the lower control line conduit through the upper control line conduit; and
    wherein preventing comprises forming the cover as a rupture disk.

14. The method as recited in claim 13, wherein preventing comprises mounting the cover to a stem with a sleeve.

15. The method as recited in claim 13, further comprising coupling the lower control line conduit to the upper control line conduit via a pair of connectors having a stem slidably and sealingly received in a receptacle.

16. The method as recited in claim 13, further comprising preventing debris from entering the upper control line conduit with a temporary cover.

17. The method as recited in claim 13, further comprising pumping a fluid across the connector to remove debris.

18. A system, comprising:
    a control line conduit connector connected to a downhole well completion assembly to connect a pair of control line conduits and thus form a continuous control line conduit in adjacent components, the control line conduits being external to a primary conduit for conducting fluid flow through the downhole well completion assembly; and
    a cover temporarily positioned over the control line conduit connector to block entry of contaminants, wherein the cover comprises a rupture disk.

19. The system as recited in claim 18, wherein the control line conduit connector is positioned in a lower well completion assembly.

20. The system as recited in claim 18, wherein the control line conduit connector is positioned in an upper well completion assembly.

21. The system as recited in claim 18, wherein the control line conduit connector comprises a stem and a receptacle.

* * * * *